(12) United States Patent
Jusko et al.

(10) Patent No.: US 11,451,561 B2
(45) Date of Patent: Sep. 20, 2022

(54) AUTOMATED CREATION OF LIGHTWEIGHT BEHAVIORAL INDICATORS OF COMPROMISE (IOCS)

(71) Applicant: Cisco Technology, inc., San Jose, CA (US)

(72) Inventors: Jan Jusko, Prague (CZ); Danila Khikhlukha, Prague (CZ); Harshit Nayyar, Alberta (CA)

(73) Assignee: Cisco Technology, Inc., San Jose, CA (US)

( * ) Notice: Subject to any disclaimer, the term of this patent is extended or adjusted under 35 U.S.C. 154(b) by 851 days.

(21) Appl. No.: 16/131,146

(22) Filed: Sep. 14, 2018

(65) Prior Publication Data

US 2020/0092306 A1 Mar. 19, 2020

(51) Int. Cl.
*H04L 9/40* (2022.01)
*G06F 16/28* (2019.01)

(52) U.S. Cl.
CPC ........ *H04L 63/1416* (2013.01); *G06F 16/285* (2019.01)

(58) Field of Classification Search
CPC ............. H04L 63/1416; H04L 63/1425; G06F 16/285; G06F 16/245
USPC .......................................................... 726/23
See application file for complete search history.

(56) References Cited

U.S. PATENT DOCUMENTS

| | | | | |
|---|---|---|---|---|
| 8,561,193 B1* | 10/2013 | Srivastava | ............ | G06F 21/563 726/24 |
| 9,584,541 B1* | 2/2017 | Weinstein | ......... | H04L 29/06884 |
| 9,998,484 B1* | 6/2018 | Buyukkayhan | ....... | G06F 16/285 |
| 10,015,192 B1* | 7/2018 | Stiborek | ............... | H04L 63/145 |
| 10,104,101 B1* | 10/2018 | Thakar | .................... | G06F 21/56 |
| 10,419,469 B1* | 9/2019 | Singh | .................. | G06F 16/9024 |
| 10,437,996 B1* | 10/2019 | Li | ............................ | H04L 63/20 |
| 10,579,796 B1* | 3/2020 | Neel | .................... | H04L 61/2007 |
| 10,628,586 B1* | 4/2020 | Jung | ....................... | G06F 21/52 |
| 10,893,059 B1* | 1/2021 | Aziz | .................. | H04L 63/1416 |
| 2002/0157020 A1* | 10/2002 | Royer | ................ | H04L 63/1425 726/11 |
| 2011/0103711 A1* | 5/2011 | Su | ............................ | G06T 1/20 382/276 |

(Continued)

OTHER PUBLICATIONS

Catakoglu, et al., "Automatic Extraction of Indicators of Compromise for Web Applications", WWW 2016, Apr. 11-15, 2016, Montréal, Québec, Canada., 11 pages, 2016, International World Wide Web Conference Committee (IW3C2).

(Continued)

*Primary Examiner* — Dereena T Cattungal
(74) *Attorney, Agent, or Firm* — Behmke Innovation Group LLC; Kenneth J. Heywood; Jonathon P. Western (57) ABSTRACT

In one embodiment, a device obtains execution records regarding executions of a plurality of binaries. The execution records comprise command line arguments used during the execution. The device determines measures of similarity between the executions of the binaries based on their command line arguments. The device clusters the executions into clusters based on the determined measures of similarity. The device flags the command line arguments for a particular one of the clusters as an indicator of compromise for malware, based on at least one of the binaries associated with the particular cluster being malware.

17 Claims, 6 Drawing Sheets

(56) References Cited

U.S. PATENT DOCUMENTS

| | | | |
|---|---|---|---|
| 2011/0162070 A1* | 6/2011 | Krasser | G06F 21/564 |
| | | | 726/23 |
| 2012/0079596 A1* | 3/2012 | Thomas | H04L 63/1433 |
| | | | 726/24 |
| 2014/0090061 A1* | 3/2014 | Avasarala | G06F 21/56 |
| | | | 726/24 |
| 2017/0270296 A1* | 9/2017 | Kraemer | G06F 21/52 |
| 2018/0077183 A1* | 3/2018 | Swann | H04L 63/1425 |
| 2019/0068616 A1* | 2/2019 | Woods | H04L 63/145 |
| 2019/0102552 A1* | 4/2019 | Pavlyushchik | G06F 21/568 |
| 2019/0104139 A1* | 4/2019 | Xu | G06F 40/20 |
| 2019/0190936 A1* | 6/2019 | Thomas | H04L 63/145 |
| 2019/0266323 A1* | 8/2019 | Nguyen | H04W 12/12 |

OTHER PUBLICATIONS

Stiborek, et al., "Probabilistic analysis of dynamic malware traces", Computers & Security, vol. 74, May 2018, pp. 221-239, Elsevier Ltd.

Meyerhenke et al. "Parallel Graph Partitioning for Complex Networks" arXiv:1404.4797v3 [cs.DC] Jan. 26, 2015; pp. 1-12.

* cited by examiner

AUTOMATED CREATION OF LIGHTWEIGHT BEHAVIORAL INDICATORS OF COMPROMISE (IOCS)

TECHNICAL FIELD

The present disclosure relates generally to computer networks, and, more particularly, to the automated creation of lightweight behavioral indicators of compromise (IOCs).

BACKGROUND

Malicious software, also known as malware, may cause an infected host to perform a wide variety of undesirable actions. For example, some malware may seek to exfiltrate data from the infected host. In another example, some malware, also known as ransomware, may threaten to destroy data or prevent access to the infected host, unless the user pays a ransom. In a further example, other forms of malware may cause the infected host to participate in a distributed denial of service (DDoS) attack. In general, the goal of a DDoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the resources of the network by flooding the network with requests, to prevent legitimate requests from being processed. When viewed in isolation, a particular one of such a request may not appear to be malicious. However, in the aggregate, the requests may overload a resource, thereby impacting legitimate requests sent to the resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains execution records regarding executions of a plurality of binaries. The execution records comprise command line arguments used during the execution. The device determines measures of similarity between the executions of the binaries based on their command line arguments. The device clusters the executions into clusters based on the determined measures of similarity. The device flags the command line arguments for a particular one of the clusters as an indicator of compromise for malware, based on at least one of the binaries associated with the particular cluster being malware.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2 and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
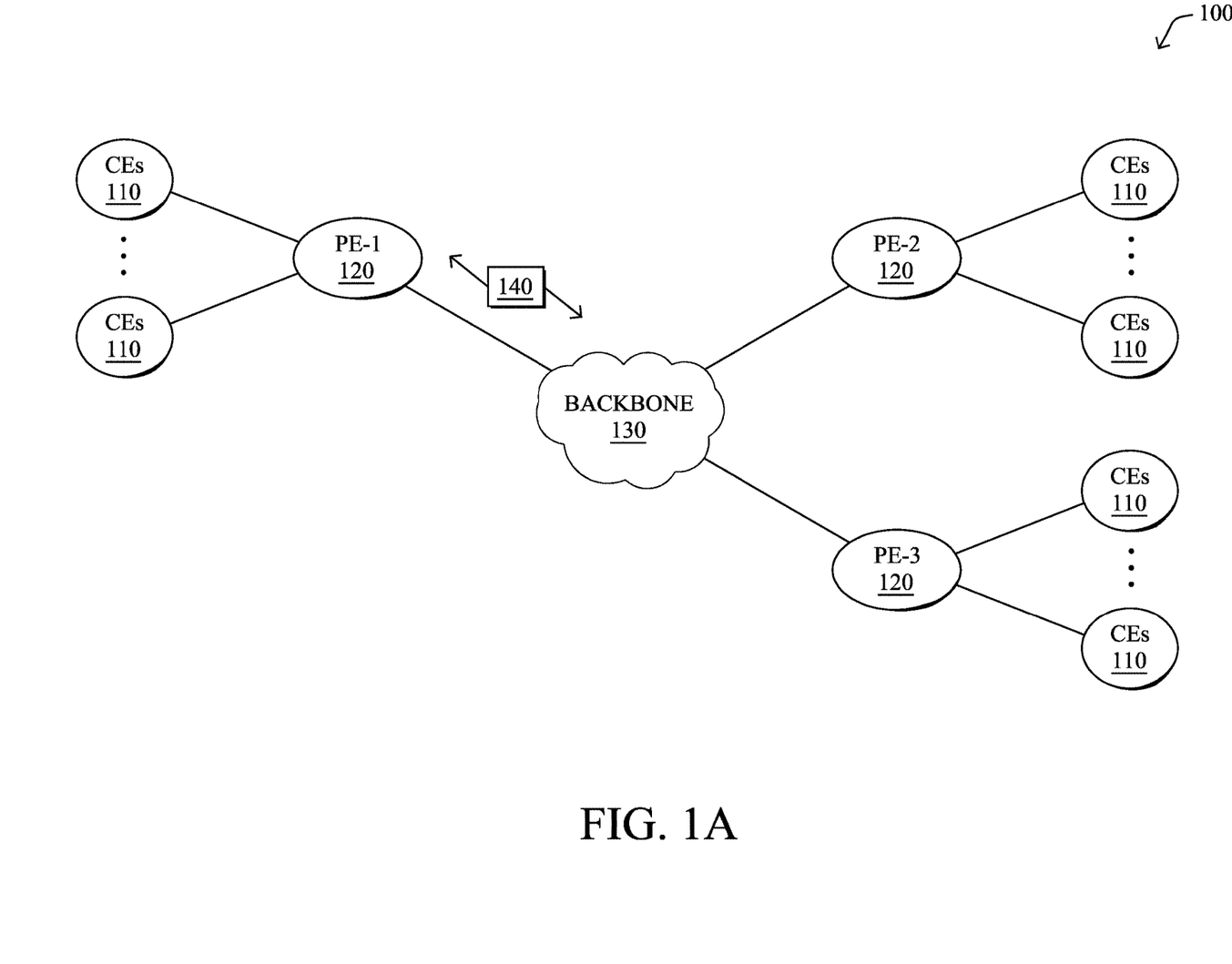
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
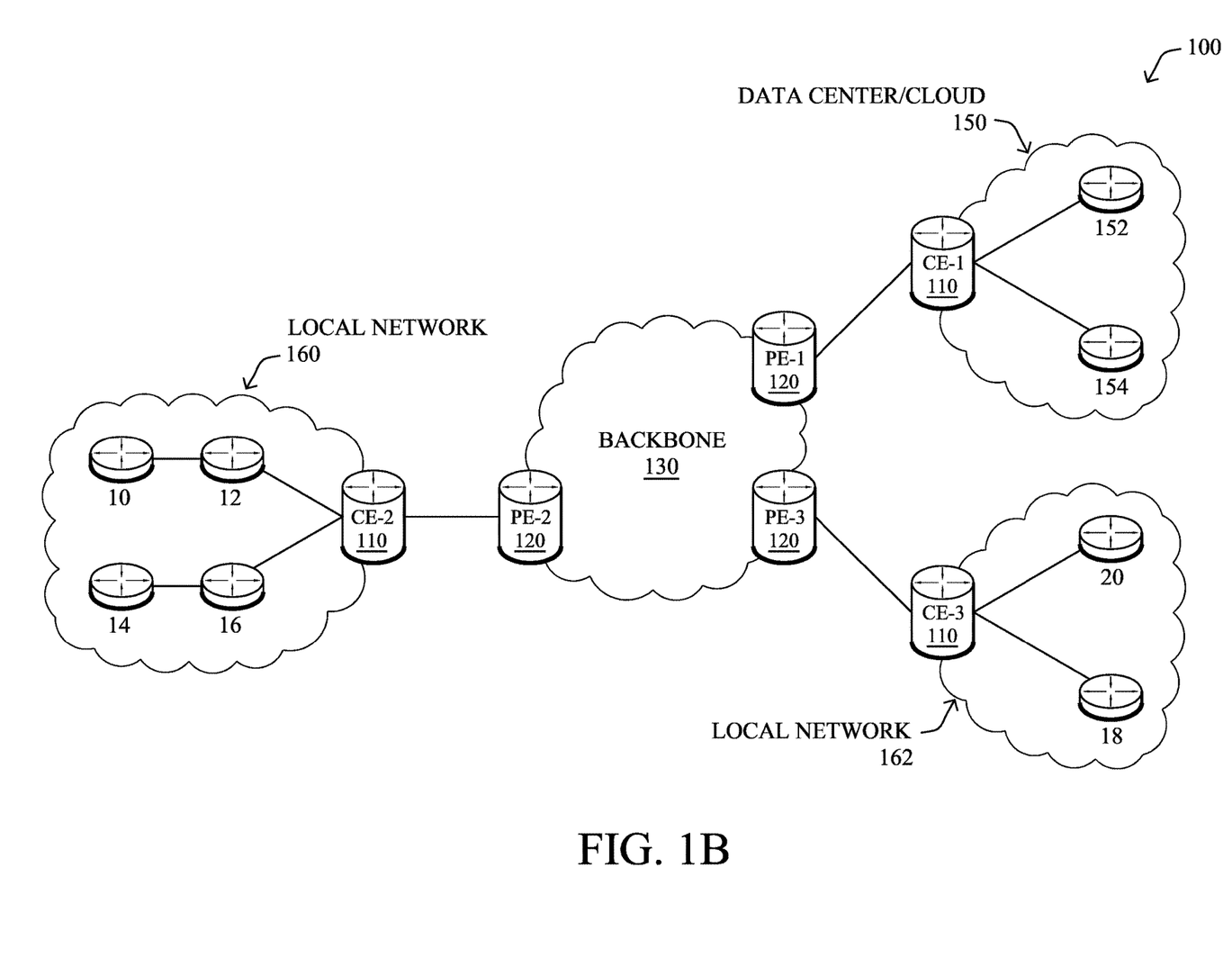

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
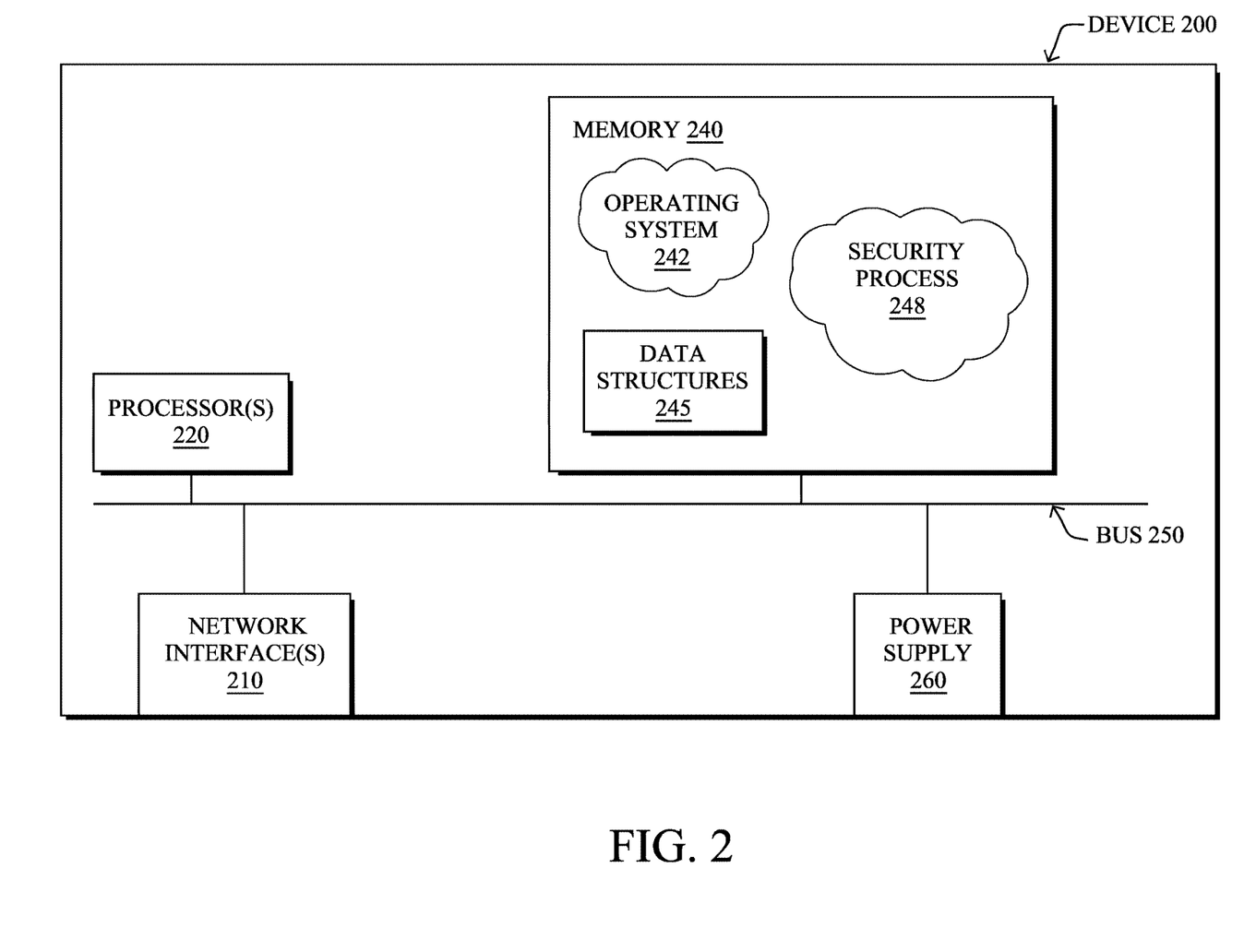
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a security process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, security process 248 may execute one or more machine learning-based classifiers to classify a software binary (e.g., an application) as benign or malicious. In some embodiments, security process 248 may assess behavioral data regarding the behavior of the binary under scrutiny (e.g., the local behavior on the host, traffic generated by the host, etc.), to perform the classification. For example, local behaviors of a binary may include data regarding the execution of the binary (e.g., command line commands, etc.), the libraries used by the binary, or the like. Similarly, traffic behaviors of the binary could include, for example, packet sizes, packet header information, packet timing information, address information, or the like. In some cases, security process 248 may also assess the characteristics of the binary file (e.g., a hash or signature of the file, etc.), to aid in the classification.

Security process 248 may employ any number of machine learning techniques, to classify the binary under scrutiny. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, security process 248 can use the model M to classify new data points, such as information regarding new traffic flows in the network. Often, M is a statistical model, and the cost function is inversely proportional to the likelihood of M, given the input data.

In various embodiments, security process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that security process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model labeled a benign file as malicious. Conversely, the false negatives of the model may refer to the number times that the model incorrectly labeled a malicious file as benign. True negatives and positives may refer to the number of times the model correctly labeled a file as benign or malicious, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, malware presents an ever-increasing threat to computer systems, ranging from malware that seeks to exfiltrate sensitive data to malware that disrupts device operations or destroys data. Two types of analysis are possible, to determine whether a given binary file is malicious: static analysis and dynamic analysis.

In general, static analysis entails attempting to match the characteristics of the binary file to known malware. For example, the security process may attempt to match the hash of the binary file to a hash of a known form of malware. However, many forms of malware today now employ evasion tactics such as malicious packers, code obfuscation, and polymorphism. In the case of polymorphism, for example, certain malware families purposely change the binaries so that their hashes and signatures are different on each infected device.

Dynamic analysis generally entails looking instead to the behavior of the binary file on the executing device. For example, a system can be trained to detect malware by purposely infecting a host in a sandbox environment and capturing telemetry data regarding the behavior of the malware, which is often referred to as the indicators of compromise for the malware. In turn, the trained system can then assess the behaviors of binaries in the live environment, to determine whether a certain binary or host is exhibiting similar behavior as that of the sandbox environment. However, in this case, certain malware can still evade detection by employing sandbox detection and other evasion techniques. In addition, identification of the indicators of compromise for a particular type of malware also requires distinguishing between those behaviors that are benign and those that are specific to the malware. Notably, many malware attempt to conceal their malicious activity by mimicking the behaviors of other, benign applications.

Automated Creation of Lightweight Behavioral Indicators of Compromise (IOCs)

The techniques herein allow for the automated generation of behavior-based IOCs, which can be used to perform dynamic malware detection in a network. In some aspects, the IOCs may be based on command line arguments, which can be observed by a monitoring agent (e.g., an endpoint security application) during execution of a binary file on a host. By leveraging the observations on the live hosts, no sandboxing analysis is needed for triggering the creation of a new IOC. In turn, the resulting IOCs can be leveraged to identify the execution of a malicious binary, even for certain families of polymorphic malware.

Specifically, according to one or more embodiments of the disclosure as described in detail below, a device obtains execution records regarding executions of a plurality of binaries. The execution records comprise command line arguments used during the execution. The device determines measures of similarity between the executions of the binaries based on their command line arguments. The device clusters the executions into clusters based on the determined measures of similarity. The device flags the command line arguments for a particular one of the clusters as an indicator of compromise for malware, based on at least one of the binaries associated with the particular cluster being malware.

Illustratively, the techniques described herein may be performed by hardware, software, and/or firmware, such as in accordance with the security process 248, which may include computer executable instructions executed by the processor 220 (or independent processor of interfaces 210) to perform functions relating to the techniques described herein.

Figure 3:
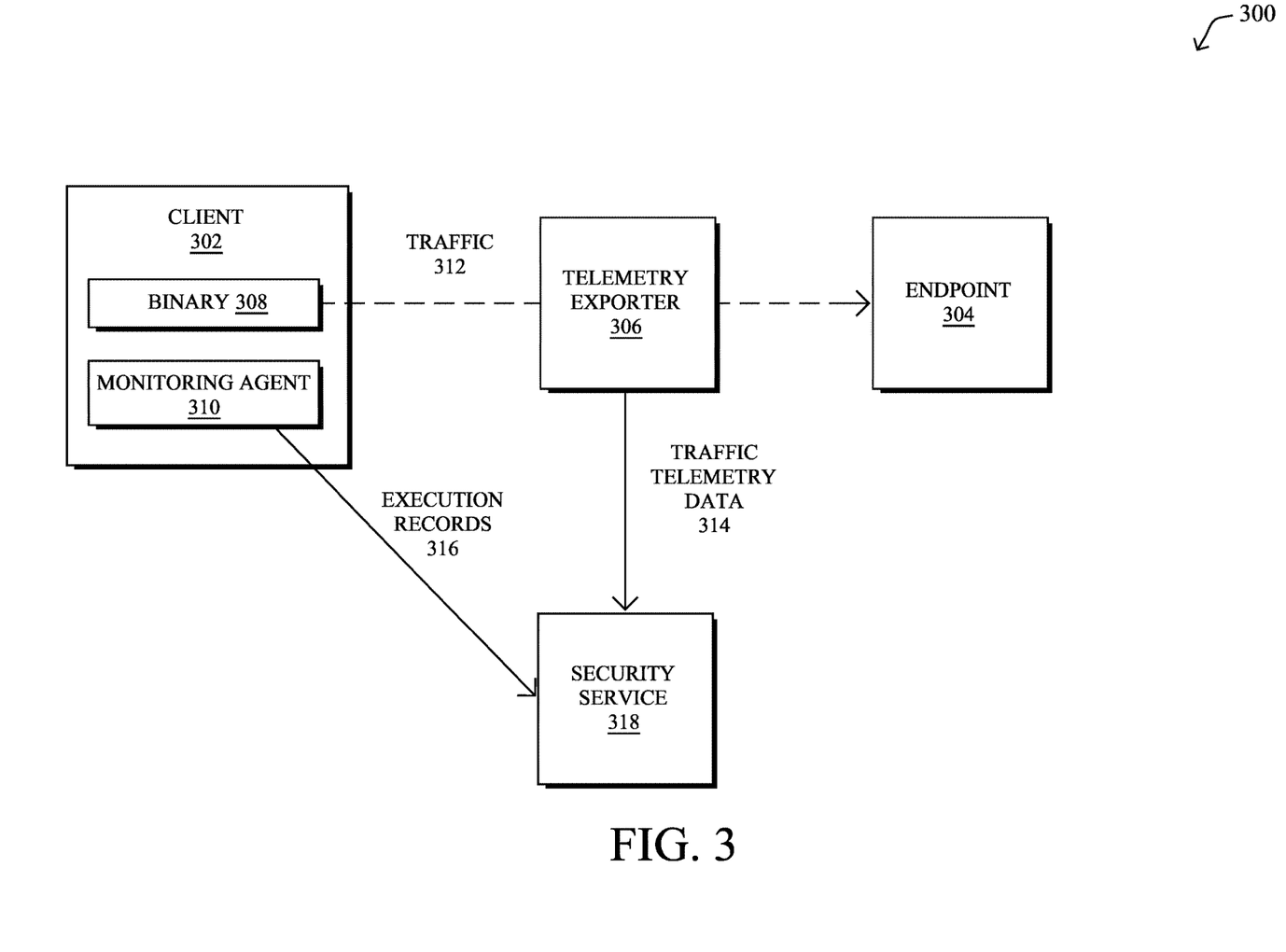
FIG. 3 illustrates an example network security system.

Operationally, FIG. 3 illustrates an example network security system 300, according to various embodiments. As shown, system 300 may include a client 302 that is to be protected from malware. For example, client 302 may be, but not limited to, a desktop or laptop computer, a tablet, a smart phone, a set-top box, a wearable device, or any other form of network-capable device. During operation, client 302 may communicate via the network with any number of endpoint devices, such endpoint 304. Endpoint 304 may be, in various cases, a remote server or service, another client in the local network of client 302, or any other device with which client 302 communicates.

Located along the network path between client 302 and endpoint 304 may be any number of telemetry exporters, such as telemetry exporter 306 shown. For example, telemetry exporter 306 may be a switch, router, firewall, server, network controller, or other networking equipment via which traffic 312 sent between client 302 end endpoint 304 flows. During operation, traffic telemetry exporter 306 may capture data regarding traffic 312, generate traffic telemetry data 314 based on the captured data, and send traffic telemetry data 314 to security service 318 for assessment. For example, traffic telemetry data 314 may include Internet Protocol Flow Information Export (IPFIX) records and/or Netflow records regarding traffic 312.

Security service 318 may be implemented by one or more devices, such as by a device 200 executing security process 248. For example, in some cases, security service 318 may be implemented by one or more devices in the local network of client 302. However, in further cases, security service 318 may be implemented as a cloud service that is in communication with telemetry exporter 306 and client 302, either directly or indirectly.

According to various embodiments, client 302 may execute a monitoring agent 310 that monitors the local operations of client 302. More specifically, monitoring agent 310 may capture application execution records 316 regarding the execution and operation of a binary 308 on client 302 under scrutiny. For example, monitoring agent 310 may calculate a process hash fingerprint of binary 308, may capture information regarding the libraries used by binary 308, and/or may capture traffic information regarding traffic 312 generated by binary 308, such as size or timing information for the packets of traffic 312, or the like. In turn, monitoring agent 310, in some embodiments, may send application execution records 316 to security service 318. In various embodiments, as detailed below, application execution records 316 may also include data regarding the command line arguments used by binary 308 during execution. Example monitoring applications that may be suitable for performing the tasks herein may include, but are not limited to, AnyConnect Network Visibility Module (NVM) by Cisco Systems, Inc., Advanced Malware Protection (AMP) by Cisco Systems, Inc., Application Performance Management by AppDynamics, certain monitoring functions of the resident operating system, and other suitable monitoring functions.

In some cases, security service 318 may use traffic telemetry data 314 and/or application execution records 316 to determine whether binary 308 is malware. In other words, security service 318 may operate in conjunction with monitoring agent 310 to identify malware on client 302, based on the behavior of the binary. In various embodiments, security service 318 may generate any number of indicators of compromise (IOC) indicative of malware that can be compared to the observed behavior of binary 308. In various embodiments, security service 318, itself, may utilize the IOCs to make the final malware assessment or, alternatively, security service 318 may provide the IOCs to monitoring agent 310 for use by agent 310 to make malware assessments locally on client 302.

When binary 308 is identified as malware, or suspected of being malware, based on a comparison of the behavior of binary 308 and the IOCs determined by security service 318, any number of mitigation actions can be taken in system 300. In some embodiments, the detecting process (e.g., monitoring agent 310 and/or security service 318) may block execution of the malicious binary on client 302, may block traffic in the network associated with the binary or client 302, and/or may send an alert regarding the detected malware (e.g., to the user of client 302, to a network administrator, etc.).

As would be appreciated, there are hundreds of thousands of new malicious binaries seen each day. These malware samples belong to a number of malware families and different variants. However, the sheer volume of malicious binaries per day makes it unfeasible to observe the behavior of each binary in a sandbox environment, in order to determine the IOCs for that malware sample.

According to various embodiments herein, security service 318 may generate IOCs based on the command line arguments used by certain types of malware. A monitoring agent can observe these indicators directly on an endpoint client, meaning that execution in a sandbox environment is not necessary. In addition, using certain command line arguments as IOCs allows for the detection of polymorphic malware that may otherwise appear as unrelated files across different endpoint clients.

Figure 4:
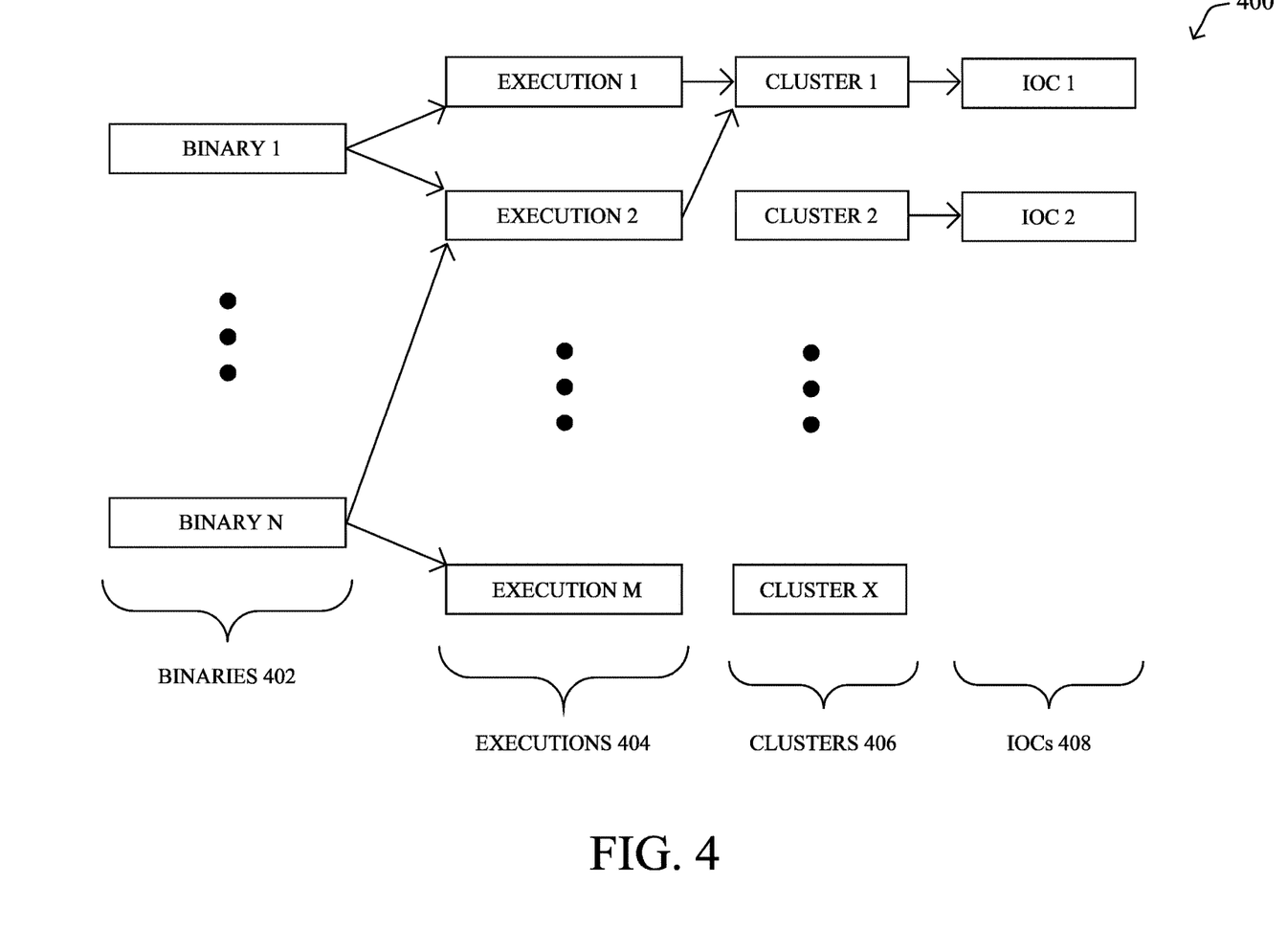
FIG. 4 illustrates an example of clustering executions based on the command line arguments used, to identify an indicator of compromise (IOC)

FIG. 4 illustrates an example 400 of clustering executions based on the command line arguments used, to identify an IOC, according to various embodiments. For example, security process 248 may perform the steps described herein, to flag the command line arguments of a cluster of executions as IOCs, which can be used to identify malware.

As shown, assume that there are any number of binaries 402 present on one or more endpoint clients, each of which also executes a monitoring agent configured to capture data regarding the behaviors of binaries 402. This captured data may include the M-number of command line arguments used during executions 404 of binaries 402 on the endpoint clients. In other words, the monitoring agents may capture all executions 404 of malicious binaries 402 and, in some cases, a sample of unknown and legitimate executions, as well. The samples of legitimate and unknown executions can be used, in some embodiments, to estimate the precision of the generated IOCs.

Example command line executions and their constituent arguments are as follows:
1) CAWindows\system32\conhost.exe-437556848-138-3350152-1225719651-1656161831-317426979-1244741900-1444340773-1424161924
2) C:\Windows\system32\WindowsPowerShell\v1.0\PowerShell.exe-NoLogo-Noninteractive-Execution-Policy Bypass & 'C Windows\CCM\S ystemTemp\15a944ac-aace-49d4-bc0b-cd3c28cab707.ps1'
3) /usr/bin/python/mp/munki-cNXaOK/uninstallcheck_script
4) C:\windows\system32\cscript.exe Nob:AgentHIScript C:\Program Files (x86)\Symantec\Symantec Endpoint Protection\14.0.3752.1000.105\Bin64\AVScript11.js 92468 Helper.exe Symantec.SSHelper C: 22 C:\PROGRA~2\Symantec\SYMANT~1\140375~1.105\Temp" 0//E:JScript
5) C:\Windows\system32\WerFault.exe-u -p 11324 -s 1180
6) C:\Program Files (x86)\Internet Explorer\ IEXPLORE.EXE SCODEF:5752 CREDAT:144385/prefetch:2
7) C:\Windows\Microsoft.NET\Framework\v2.0.50727\csc.exe/noconfig/fullpaths @C:\WINDOWS\TEMP\k4Ooa8 cd.cmdline
8) C:\Users\userA\AppData\Local\Google\Chrome\Application\chrome.exe—type=renderer—field-trial-handle=1484,17035086770893962831, 3654511753468748175,131072—service-pipe-token=27B66590EABD520075F1881DE7C04CFF—lang=en-US—extension-process—enable-offline-auto-reload—enable-offline-auto-reload-visible-only—device-scale-factor=1—num-raster-threads=2—enable-main-frame-before-activation—service-request-channel-token=27B66590EABD520075F 1881DE7C04CFF—renderer-client-id=2300—mojo-platform-channel-handle=7032/prefetch:1
9) C:\WINDOWS\SysWOW64\SearchProtocolHost.exe Global\UsGthrFltPipeMssGthrPipe_S-1-5-21-205025 4471-3077941323-912101608-37831398_Global\ UsGthrCtrlFltPipeMssGthrPipe_S-1-5-21-20502 54471-3077941323-912101608-37831398 1-214 7483 646 Software\Microsoft\Windows Search Mozilla/4.0 (compatible; MSIE 6.0; Windows NT; MS Search 4.0 Robot) C:\ProgramData\Microsoft\Search\Data\ Temp\ usgthrsvc DownLevelDaemon 1
10) C:\WINDOWS\SysWOW64\SearchProtocolHost.exe Global\UsGthrFltPipeMssGthrPipe_S-1-5-21-80859 62-1496340521-1291082073-377895588_Global\Us GthrCtrlFltPipeMssGthrPipe_S-1-5-21-8085962-14 96340521-1291082073-377895588 1-2147483646 Software\Microsoft\Windows Search Mozilla/4.0 (compatible; MSIE 6.0; Windows NT; MS Search 4.0 Robot) C:\ProgramData\Microsoft\Search\Data\Temp\ usgthrsvc DownLevelDaemon 1
11) C:\Program Files (x86)\Tanium\Tanium Client\ Tools\Trace\TaniumSQLiteQuery.exe—percentEn-coded—input C %3A %5CProgram %20Files %20% 28x86%29%5CTanium %5CTanium %20Clie nt %5CTools %5CTrace %5CQueries %5Crad 0A01E.tmp—file C\Program Files (x86)\Tanium\ Tanium Client\\monitor.db—delimiter |#
12) C:\WINDOWS\system32\wuauclt.exe/RunStoreAs ComServer Local\[438] SUSDS4d620f1e29733441bb 5ee5e31fe98dca In some embodiments, the security process may parse each of the captured command line executions, such as those shown above, and extract out their named arguments for further processing. If the grammar of the command line execution is known by the security process, then the security process may also consider the positional arguments. However, in most cases, the specific grammar of the execution will be unknown to the security process and the positional arguments can be ignored.

To model the behavior of the command line executions, the security process may employ a bag of words approach, according to various embodiments. For example, in one embodiment, the security process may compute a term frequency-inverse document frequency (TF-IDF) vector to represent each command line execution. In general, TF-IDF applies a score to each argument in the command line execution such that frequently used arguments (e.g., debug, -help, etc.) are discounted.

After scoring each of the arguments of executions 404, the security service may cluster executions 404 into X-number of clusters 406, based on their pairwise similarities. Any suitable graph clustering approach can be used for this step, in various embodiments, such as a PageRank-based approach or the like. In one specific embodiment, the security service may construct clusters 406 using a parallel label propagation approach. In general, parallel label propagation operates by representing executions 404 as graph nodes, structuring the graph of nodes according to their similarities by analyzing different sections of the graph in parallel, and grouping nodes into clusters based on their locations in the graph.

Once the security process has generated the clusters 406 of executions 404, the security process may then flag the arguments of a given cluster as an IOC 408 for a particular type of malware. For example, in some embodiments, the security process may filter the list of candidate IOCs 408 according to any or all of the following rules:

Clusters 406 containing argument executions of legitimate/benign binaries 402 may be removed from consideration, to avoid creating IOCs that misidentify the activities of legitimate/benign binaries as malicious.

Clusters 406 hitting on high-prevalence, unknown binaries 402 may be removed from consideration. This rule is based on the assumption that the number of clients executing a particular malicious binary will be rather small, as compared to the full set of clients. For example, if a threshold number or percentage of clients executed a binary 402 associated with a particular cluster 406, the security service may exclude that cluster from consideration as an IOC.

After the pre-filtering cluster 406 from consideration according to the above, the security service may then prioritize cluster 406 for IOC flagging, in various embodiments. The particular choice of cluster(s) 406 on which to base IOC(s) 408 may depend on the application area. For example, the security service may prioritize cluster 406 for consideration according to any or all of the following criteria:

Clusters 406 containing executions of high-risk malware are preferred.

Clusters 406 associated with a high number of unique binaries 402 are preferred.

Finally, the security service may convert a particular cluster 406 into an IOC 408 by flagging the command line arguments that are typical for the cluster in question as an IOC. Usually, there are several command line arguments within a cluster 406, and the security process may select the biggest set of command line arguments that guarantees a reasonable coverage of the cluster 406 as an IOC 408. In one embodiment, the security process may use a greedy approach to the flagging of command line arguments as IOCs. For example, the security process may sort arguments according to their popularity within the cluster 406 in question and select the first k-number of clusters that guarantee acceptable recall as IOCs 408. In other words, the resulting IOCs 408 are composed of a subset of the observed command line arguments that are likely to indicate the presence of malware. In turn, if all of the command line arguments in the IOC are present in a given execution, the IOC triggers a detection of malware and the performance of an appropriate mitigation action (e.g., sending an alert, blocking the binary from execution, etc.).

In some embodiments, the security process may also disable an IOC 408, based on its performance after deployment. For example, the security process may monitor the number of binaries identified as malware based on the generated IOC 408 and, if too many binaries are flagged as malware (e.g., the number or percentage exceeds a certain threshold), the security process may stop the use of the IOC 408.

The proposed malware detection approach works because different malware variants of the same family often use the same set of command line arguments and these are command lines are often not seen in benign command line executions. Modern malware consists of multiple components and, often, a dropper component is responsible for execution of a malicious binary. This dropper passes specific and unique command line arguments to the malicious binary. For example, a dropper that executes a ransomware binary can pass in amount of ransom to demand as a command line argument. The argument value can vary on a per-environment or per-campaign basis, but the argument name remains the same and can be used as an effective IOC to detect the presence of malware on the executing endpoint client.

Figure 5:
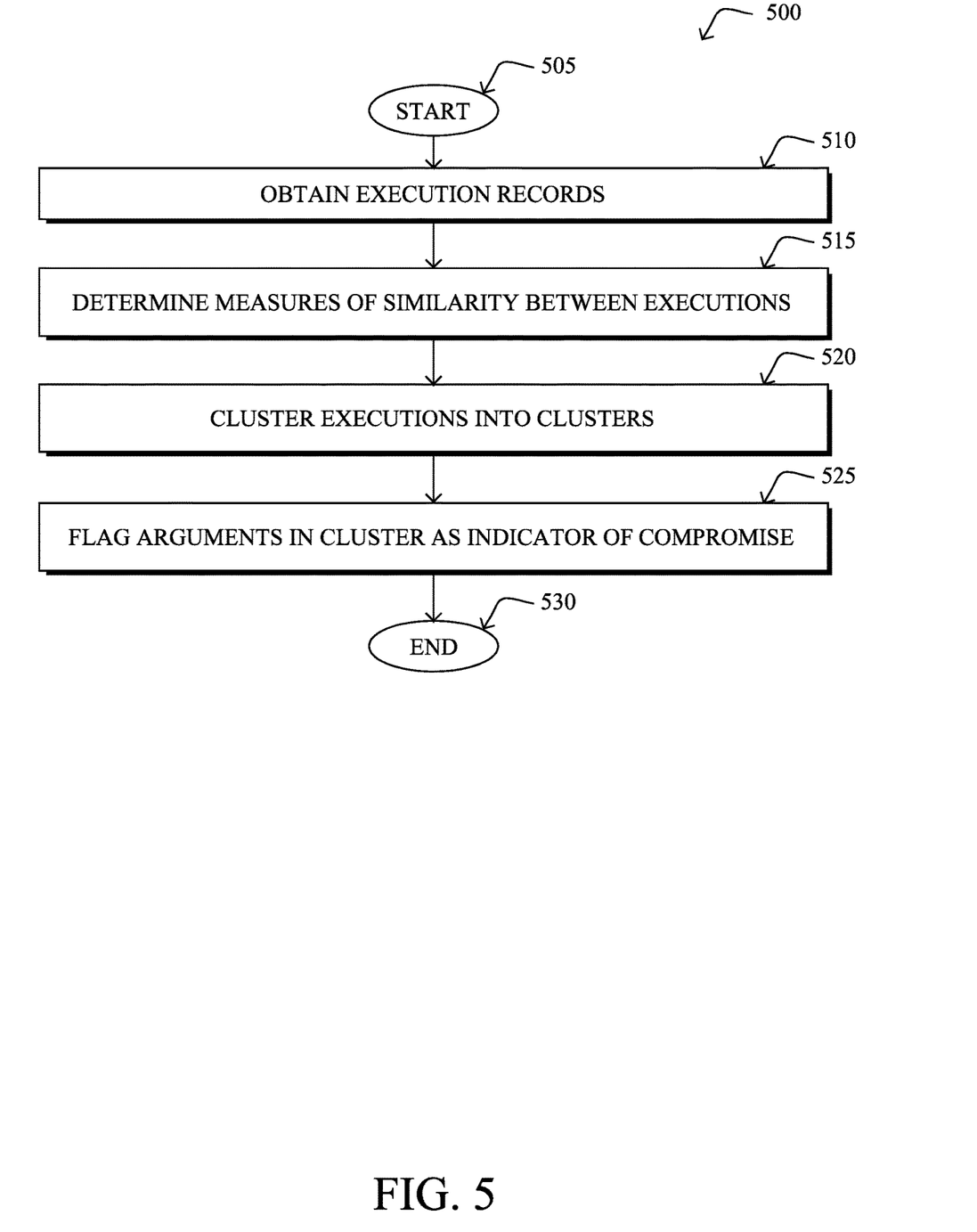
FIG. 5 illustrates an example simplified procedure for creating lightweight IOCs.

FIG. 5 illustrates an example simplified procedure for creating lightweight IOCs in a network, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device obtains execution records for a plurality of binaries. Such records may include, for example, the command line arguments used during the executions. In some embodiments, the device may receive the execution records from a set of monitoring agents running on any number of clients on which the binaries are also executed. In other embodiments, the device itself may monitor binaries executed locally on the device.

At step 515, as detailed above, the device may determine measures of similarity between the executions based on their command line arguments. In some embodiments, the device may do so by forming term frequency-inverse document frequency (TF-IDF) vectors for each command line execution. Doing so will assign TF-IDF scores to each of the arguments and weight arguments that rarely appear more highly than those that are commonly seen.

At step 520, the device may cluster the executions into clusters based on the determined measures of similarity, as described in greater detail above. In some embodiments, the device may employ a graph clustering approach to the scored command line arguments, such as by applying parallel label propagation to the command line arguments. In general, the resulting clusters may each comprise the arguments used by similar command line executions.

At step 525, as detailed above, the device may flag the command line arguments for a particular one of the clusters as an indicator of compromise for malware, based on at least one of the binaries associated with the particular cluster being malware. In particular, if one of the binaries is known to be of a particular type of malware, those binaries that also execute the same or similar command line arguments may also be related malware, such as part of the same polymorphic malware family. In some embodiments, the device may filter out from IOC consideration at least one of the clusters of command line arguments based on the cluster being associated with a known benign binary or a binary with high prevalence of execution by a set of clients. In further embodiments, the device may select the particular cluster for IOC flagging, based on the number of unique binaries associated with the particular cluster or based on at least one binary associated with the cluster being high-risk malware. Once the command line arguments of the cluster have been flagged as an IOC, the device may provide the IOC to any number of client-executed monitoring agents for use to detect malware on the clients. In addition, the device may receive feedback from the monitoring agents and, if the performance of the IOC is not within a predefined range, disable the use of the generated IOC. Procedure 500 then ends at step 530.

It should be noted that while certain steps within procedures 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, propose using the command line arguments used for binary execution as IOCs for malware detection. In some aspects, the arguments are clustered based on similarity and, for malicious binaries, flagged as IOCs. In some implementations, the IOC generation process leverages both graph theory and (text) document clustering approaches. In addition, the techniques herein assume a partial knowledge of the pools of malicious and benign/legitimate binaries, as well as the availability of their executions (e.g., via application telemetry from client-based monitoring agents). Preliminary testing of the approach herein has shown the resulting IOCs to demonstrate very high precision with respect to malware detection.

While there have been shown and described illustrative embodiments that provide for the automated creation of lightweight, behavioral IOCs, it is to be understood that various other adaptations and modifications may be made within the spirit and scope of the embodiments herein. For example, while certain embodiments are described herein with respect to using certain models for purposes of malware detection, the models are not limited as such and may be used for other functions, in other embodiments. In addition, while certain protocols are shown, such as IPFIX, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, by a device, execution records regarding executions of a plurality of binaries from one or more monitoring agents that capture the execution records, the one or more monitoring agents being executed by one or more clients at which the binaries are executed, wherein the execution records comprise command line arguments used during the executions of the plurality of binaries;
   determining, by the device, measures of similarity between the executions of the binaries based on their command line arguments;
   clustering, by the device, the executions into clusters based on the determined measures of similarity; and
   flagging, by the device, the command line arguments for a particular one of the clusters as an indicator of compromise for malware, based on at least one of the binaries associated with the particular cluster being malware that uses the same command line arguments as at least a portion of the flagged command line arguments.

2. The method as in claim 1, further comprising:
   providing, by the device and via a network, data regarding the indicator of compromise to a monitoring agent executed by a client, wherein the monitoring agent uses the indicator of compromise to detect malware on the client.

3. The method as in claim 1, wherein determining the measures of similarity between the executions of the binaries comprises:
   assigning term frequency-inverse document frequency scores to the command line arguments.

4. The method as in claim 1, wherein clustering, by the device, the executions into clusters based on the determined measures of similarity comprises:
   applying parallel label propagation to the command line arguments, to perform graph clustering on the command line arguments.

5. The method as in claim 1, wherein flagging the command line arguments for a particular one of the clusters as an indicator of compromise for a type of malware comprises:
   filtering out at least one of the clusters based on the filtered cluster being associated with a benign binary or a binary with high prevalence of execution by a set of clients.

6. The method as in claim 1, wherein flagging the command line arguments for a particular one of the clusters as an indicator of compromise for a type of malware comprises:
   selecting the particular cluster for the flagging, based on the number of unique binaries associated with the particular cluster.

7. The method as in claim 1, wherein flagging the command line arguments for a particular one of the clusters as an indicator of compromise for a type of malware comprises:
   selecting the particular cluster for the flagging, based on the particular cluster being associated with a high-risk malware.

8. The method as in claim 1, further comprising:
   preventing, by the device, use of the indicator of compromise for detection of malware, when the indicator of compromise triggers a threshold amount of binaries to be deemed as malware.

9. An apparatus, comprising:
   one or more network interfaces to communicate with a network;
   a processor coupled to the network interfaces and configured to execute one or more processes; and
   a memory configured to store a process executable by the processor, the process when executed configured to:
      receive execution records regarding executions of a plurality of binaries from one or more monitoring agents that capture the execution records, the one or more monitoring agents being executed by one or more clients at which the binaries are executed, wherein the execution records comprise command line arguments used during the executions of the plurality of binaries;
      determine measures of similarity between the executions of the binaries based on their command line arguments used by the plurality of binaries during execution;
      cluster the executions into clusters based on the determined measures of similarity; and
      flag the command line arguments for a particular one of the clusters as an indicator of compromise for malware, based on at least one of the binaries associated with the particular cluster being malware that uses the same command line arguments as at least a portion of the flagged command line arguments.

10. The apparatus as in claim 9, wherein the process when executed is further configured to:
    provide, via a network, data regarding the indicator of compromise to a monitoring agent executed by a client, wherein the monitoring agent uses the indicator of compromise to detect malware on the client.

11. The apparatus as in claim 9, wherein the apparatus determines the measures of similarity between the executions of the binaries by:
    assigning term frequency-inverse document frequency scores to the command line arguments.

12. The apparatus as in claim 9, wherein the apparatus clusters the executions into clusters based on the determined measures of similarity by:
  applying parallel label propagation to the command line arguments, to perform graph clustering on the command line arguments.

13. The apparatus as in claim 9, wherein the apparatus flags the command line arguments for a particular one of the clusters as an indicator of compromise for a type of malware by:
  filtering out at least one of the clusters based on the filtered cluster being associated with a benign binary or a binary with high prevalence of execution by a set of clients.

14. The apparatus as in claim 9, wherein the apparatus flags the command line arguments for a particular one of the clusters as an indicator of compromise for a type of malware by:
  selecting the particular cluster for the flagging, based on the number of unique binaries associated with the particular cluster.

15. The apparatus as in claim 9, wherein the apparatus flags the command line arguments for a particular one of the clusters as an indicator of compromise for a type of malware comprises:
  selecting the particular cluster for the flagging, based on the particular cluster being associated with a high-risk malware.

16. The apparatus as in claim 9, wherein the process when executed is further configured to:
  prevent use of the indicator of compromise for detection of malware, when the indicator of compromise triggers a threshold amount of binaries to be deemed as malware.

17. A tangible, non-transitory, computer-readable medium storing program instructions that cause a device to execute a process comprising:
  receiving, by the device, execution records regarding executions of a plurality of binaries from one or more monitoring agents that capture the execution records, the one or more monitoring agents being executed by one or more clients at which the binaries are executed, wherein the execution records comprise command line arguments used during the executions of the plurality of binaries;
  determining, by the device, measures of similarity between the executions of the binaries based on their command line arguments;
  clustering, by the device, the executions into clusters based on the determined measures of similarity; and
  flagging, by the device, the command line arguments for a particular one of the clusters as an indicator of compromise for malware, based on at least one of the binaries associated with the particular cluster being malware that uses the same command line arguments as at least a portion of the flagged command line arguments.

* * * * *

UNITED STATES PATENT AND TRADEMARK OFFICE
CERTIFICATE OF CORRECTION

PATENT NO. : 11,451,561 B2
APPLICATION NO. : 16/131146
DATED : September 20, 2022
INVENTOR(S) : Jan Jusko et al.

It is certified that error appears in the above-identified patent and that said Letters Patent is hereby corrected as shown below:

In the Specification

Column 3, Line 44, please replace as shown:
3.) Site Type C: a site of type B (e.g., types B1, B2 or B3)

Column 9, Line 25, please replace as shown:
1) C:\Windows\system32\conhost.exe-437556848-138-

Column 9, Line 30, please replace as shown:
Policy Bypass & 'C:\Windows\CCM\SystemTemp\

Column 9, Line 32, please amend as shown:
3) /usr/bin/python/tmp/munki-cNXaOK/uninstallcheck_

Column 9, Line 34, please replace as shown:
4) C:\windows\system32\cscript.exe //Job:AgentHIScript Signed and Sealed this
Twentieth Day of December, 2022

Katherine Kelly Vidal
*Director of the United States Patent and Trademark Office*